(12) United States Patent
Szlezak

(10) Patent No.: US 9,624,080 B2
(45) Date of Patent: Apr. 18, 2017

(54) METHOD FOR PRODUCING A FORK ARM, AND FORK ARM

(76) Inventor: Philipp Szlezak, Vienna (AT)

( * ) Notice: Subject to any disclaimer, the term of this patent is extended or adjusted under 35 U.S.C. 154(b) by 402 days.

(21) Appl. No.: 14/126,346

(22) PCT Filed: Jun. 5, 2012

(86) PCT No.: PCT/AT2012/050079
§ 371 (c)(1),
(2), (4) Date: Mar. 4, 2014

(87) PCT Pub. No.: WO2012/171051
PCT Pub. Date: Dec. 20, 2012

(65) Prior Publication Data
US 2014/0246272 A1 Sep. 4, 2014

(30) Foreign Application Priority Data
Jun. 15, 2011 (AT) .................. A 874/2011

(51) Int. Cl.
B66F 9/12 (2006.01)
B23K 15/00 (2006.01)
B23K 26/24 (2014.01)
B23K 26/242 (2014.01)
B23K 101/00 (2006.01)

(52) U.S. Cl.
CPC ............ *B66F 9/12* (2013.01); *B23K 15/0006* (2013.01); *B23K 15/006* (2013.01); *B23K 15/0053* (2013.01); *B23K 26/24* (2013.01); *B23K 26/242* (2015.10); *B23K 2201/006* (2013.01)

(58) Field of Classification Search
CPC ........ B23K 26/24; B23K 26/34; B23K 26/32; B23K 26/302; B23K 2203/16; B23K 2203/08; B23K 2203/2201; B23K 2203/50; B23K 15/00; B23K 15/0013; B66F 9/12
See application file for complete search history.

(56) References Cited

U.S. PATENT DOCUMENTS 6,271,499 B1 * 8/2001 Jones ..................... B23K 26/24
219/121.63

FOREIGN PATENT DOCUMENTS

DE 265050 A 2/1989
DE 19515834 C1 * 5/1996 ................ B66F 9/12
(Continued)

OTHER PUBLICATIONS

Machine Translation of DE 195 15 834 performed Feb. 17, 2016.*
(Continued)

Primary Examiner — Brian Jennison
(74) Attorney, Agent, or Firm — Design IP

(57) ABSTRACT

A method for producing a fork arm (18) for load-carrying devices, said fork comprising a fork blade (5) which is substantially horizontal in the operating position, and a substantially vertical fork back (20) that connects via a fork bend (19) to said fork blade and is provided with connection elements (2, 3) for the conveying device, wherein the fork arm consists of a plurality of parts (1; 2, 4, 8, 9, 11; 18', 12 to 17) that are connected to one another, at least a number of said parts are welded to one another, and parts (1; 2, 4, 8, 9, 11; 18', 12 to 17) of the fork arm are welded to one another by electron beam welding and/or laser welding, wherein the weld penetrates planarly with a depth of at least 15 mm between adjoining surfaces of the parts.

5 Claims, 8 Drawing Sheets

(56) References Cited

FOREIGN PATENT DOCUMENTS

| | | |
|---|---|---|
| EP | 0560524 A1 | 9/1993 |
| GB | 2436554 A | 3/2007 |
| JP | 9234523 A | 9/1997 |
| JP | 2005138153 A | 6/2005 |

OTHER PUBLICATIONS

Bennett, D. C. et al.: "Practical Uses for Laser Beam Welding", Welding Journal, American Welding Society, Miami, FL, US, vol. 69, No. 10, Oct. 1, 1990, pp. 52-54, XP000175363 ISSN: 0043-2296.

European Patent Office, International Search Report for Application No. PCT/AT2012/050079, mailed Oct. 4, 2012.

* cited by examiner

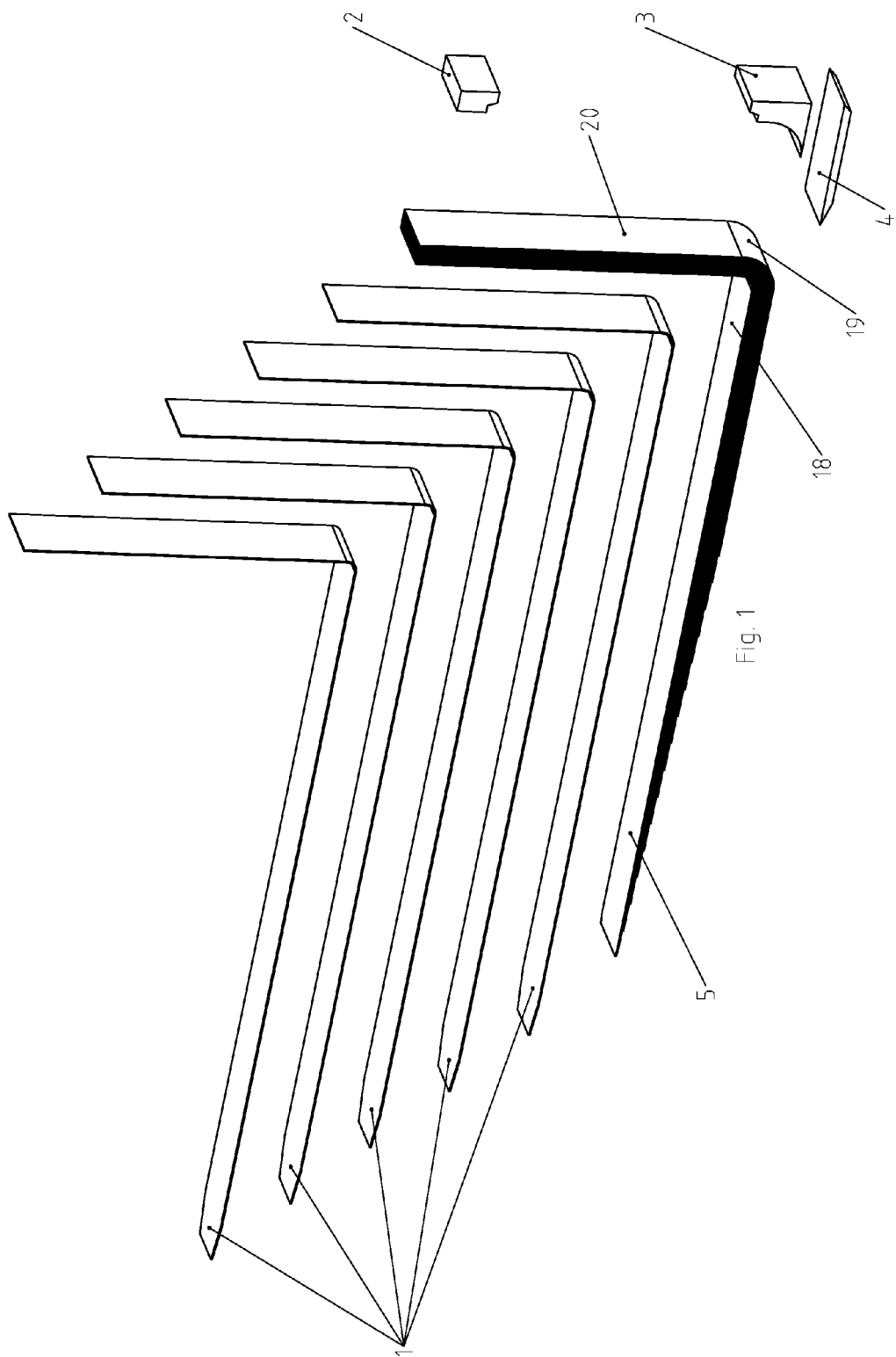

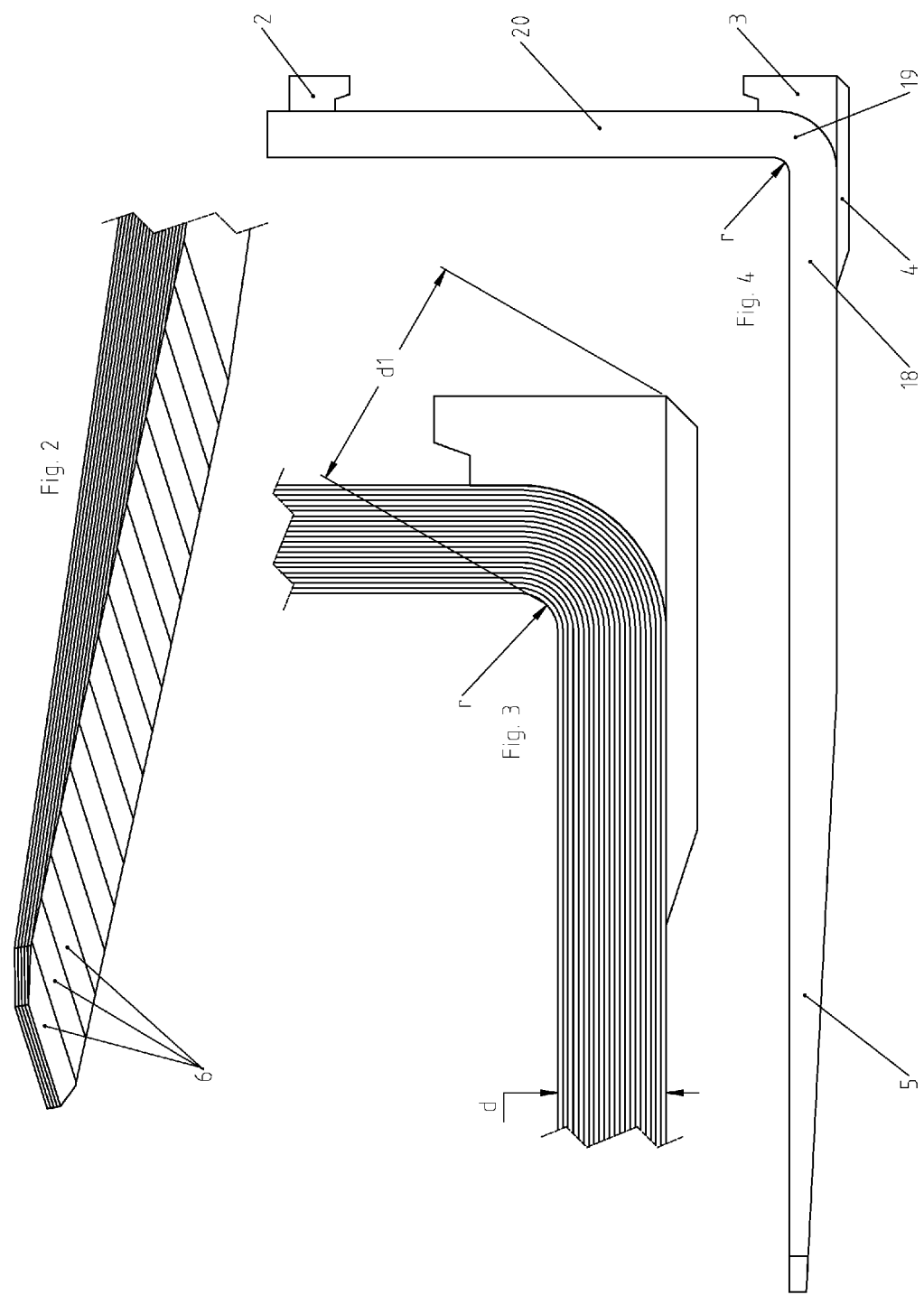

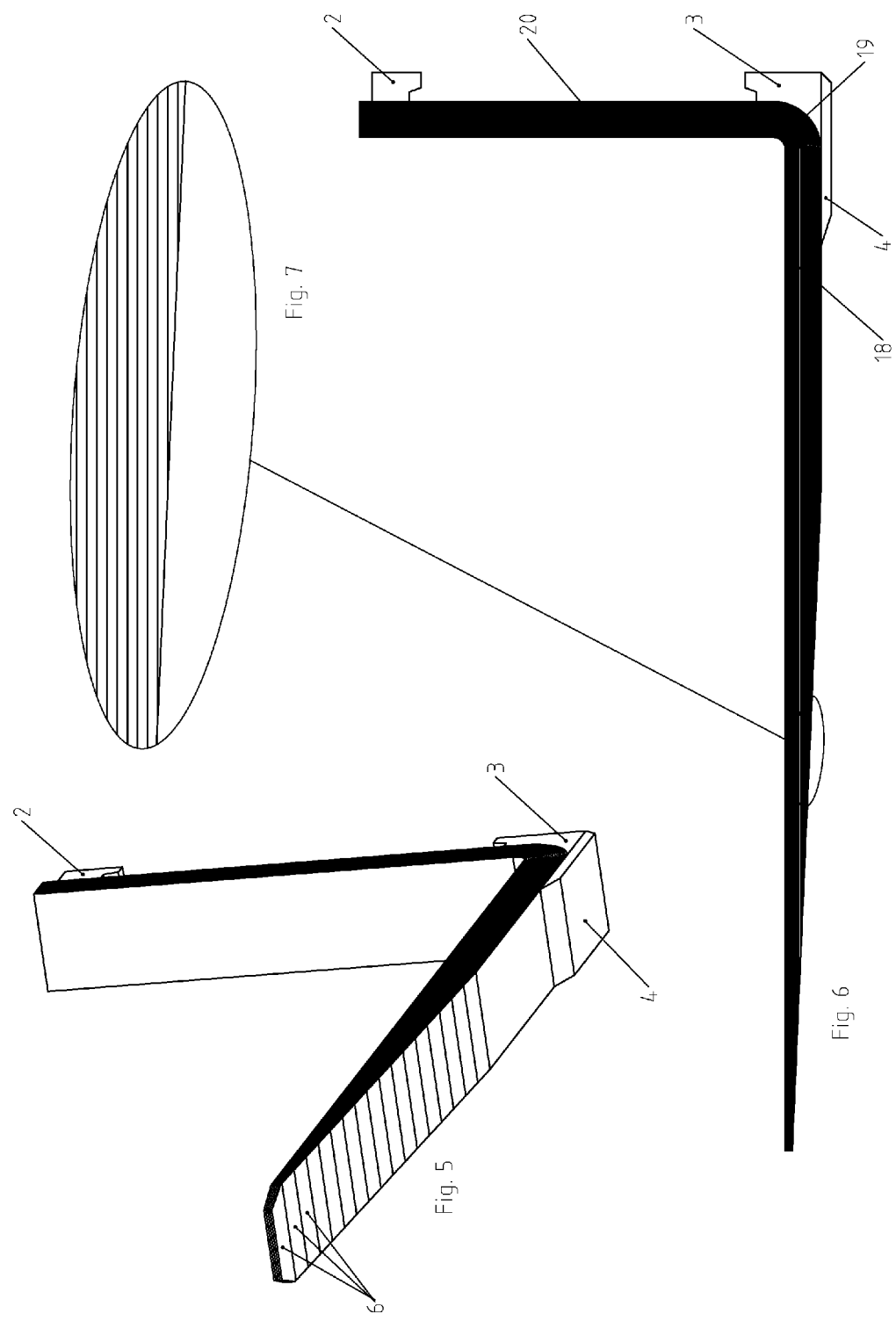

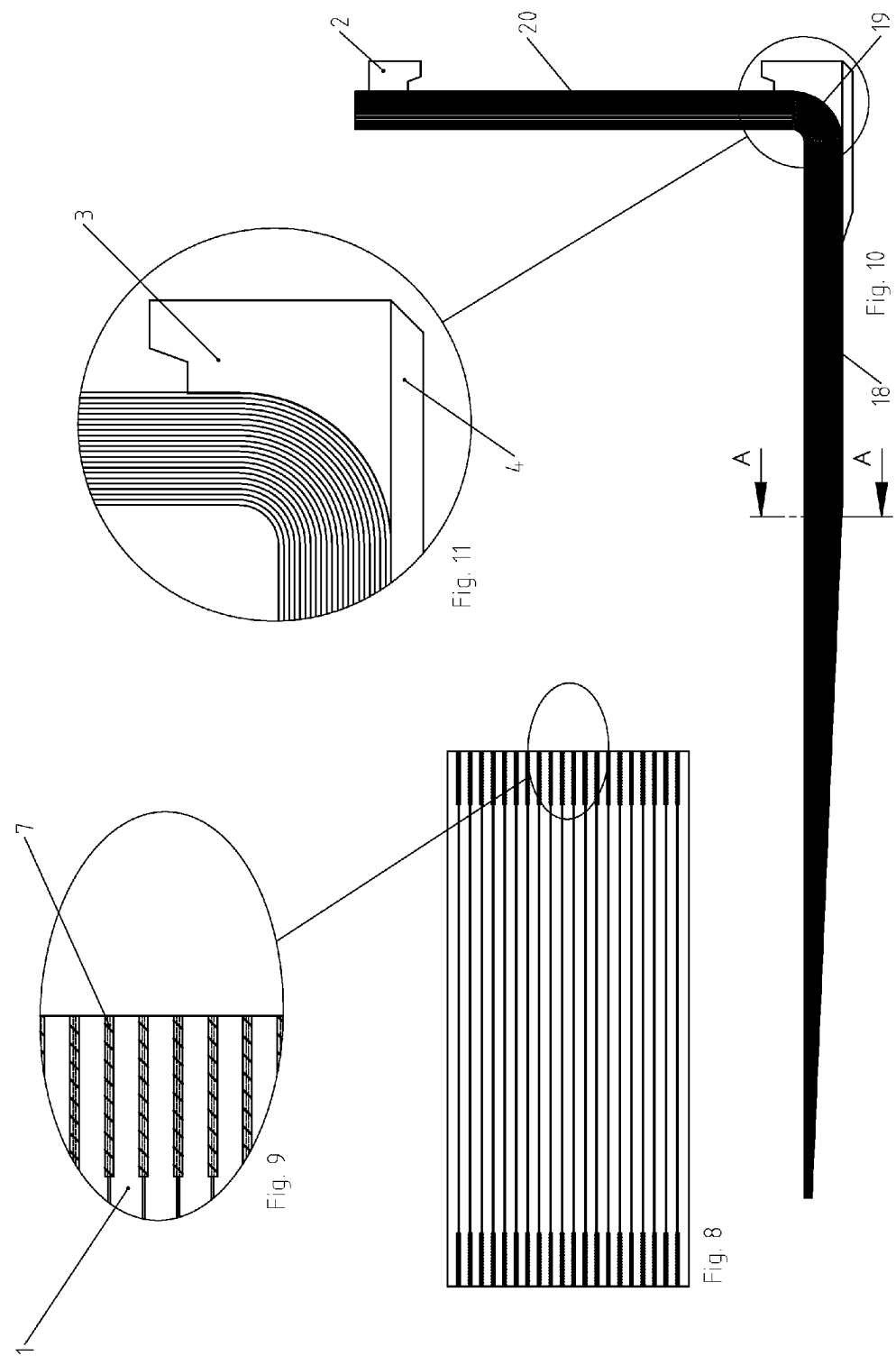

METHOD FOR PRODUCING A FORK ARM, AND FORK ARM

BACKGROUND OF THE INVENTION

The invention relates to a method for producing a fork arm for load-carrying devices, said fork arm comprising a fork blade which is substantially horizontal in the operating position, and a substantially vertical fork back that connects via a fork bend to said fork blade and is provided with connection elements for the conveying device, wherein the fork arm consists of a plurality of parts that are connected to one another, and at least a number of said parts are welded together.

The invention also relates to a fork arm produced according to this method.

A known fork arm is disclosed in DD 256 050 A3 and is shown and described there in the sole exemplary embodiment as consisting of three steel lamellas welded together at the edge by means of a fillet weld, wherein it is mentioned that the individual lamellas can be adhesively bonded to one another, but without suggesting a manner in which adhesive bonding can be carried out. The outer lamellas can be made here from quality steel, and the inner lamella can be made of conventional construction steel. With the described configuration, the complexity during the production is to be reduced since the individual lamellas can be produced by bending and without forging.

This known approach could indeed simplify the production; however, the strength of the fork arm cannot be achieved by the steel lamellas that are welded together at the edge by fillet welds, and, in particular, because of the lateral welding using fillet welds, the deflection of the fork arm under load is significantly greater than that of conventional fork arms made of heat treatable steel. Furthermore, the lamella thickness has been selected such that bending the fork bend has to be carried by locally heating the bending area, and energy supply is already very high during bending. A second additional increased energy supply takes place through the selected welding method using fillet welds at the edge of the steel lamellas, wherein a third further energy supply is required for stress relief annealing the welds.

For simplifying the production, it also became known from DE 195 834 C1 to fabricate the fork blade and/or the fork back or even the whole fork arm from plates that are arranged side by side and are welded together at some places. Through this, forging work can be avoided at least to a certain extent; however, welding at certain areas is complicated and critical work, which overall is detrimental to the strength of the entire fork arm.

The document EP 0 560 524 A1 likewise shows a fork arm consisting of lamellas, wherein all possibilities of connecting lamellas of a fork arm are left open; however, in particular adhesive bonding is discussed and also welding is discussed in general form, wherein as the sole example, weld beads 52 are described and shown in FIG. 4 along the lateral edges of a fork arm, which weld beads extend over the entire course of the areas to be welded together. However, this involves the outer surfaces of the lamellas, wherein welding them together effects that the welds behave like two upright flat steel bars, as a result of which these upright flat steel bars bend extensively in the load direction, wherein the individual lamellas follow this movement by axially shifting. The static effect of a fork arm structured in this manner corresponds to an equally dimensioned profiled tube, and overall, the desired strength values cannot be achieved.

SUMMARY OF THE INVENTION

It is an object of the invention to provide a method for producing a high-strength fork arm which is as light as possible and can be produced in an economic manner, and for which the disadvantages of the prior art are eliminated at least to a large extent. In particular, the production shall also proceed very rapidly, wherein, on the other hand, energy supply is very low.

This object is achieved with a method of the aforementioned kind, in which according to the invention, parts of the fork arm are welded to one another by electron beam welding and/or laser welding, wherein the weld penetrates with a depth of at least 15 mm between adjoining surfaces of the parts.

Thus, it is essential according to the invention that a planar surface connection is obtained between the individual lamellas, wherein weld depths of ca. 30% of the fork arm width (15% per side surface) or weld depths of at least 15 mm are advantageous in order to obtain an actual planarly extending welded connection that overcomes the above-mentioned problems in terms of strength. However, in many cases it is advantageous to weld over the entire width of the fork arm so that the lamellas or individual parts are welded together over the entire surface.

Further advantageous configurations of the invention are characterized in the dependent sub-claims.

The invention offers the advantage that despite low energy supply, high-quality fork arms can be produced, wherein the aforementioned disadvantages of the prior art are eliminated.

The crystalline structures of the entire fork arm and the individual steel lamellas remain largely undamaged even after welding. Due to the high power density of the electron beam welding or laser welding process, the welds are very narrow, (preferably less than 1 mm), but, on the other hand, they are deep (up to 100 mm) so that a high-strength planarly extending connection between the lamellas is achieved without additional material supply. The strength of the welds is so high that a weld depth of 30% of the fork arm width is sufficient for producing a super high strength fork arm that corresponds to the strength potential of the super high strength sheets of the individual lamellas with a tensile strength of, for example, 1500 N/mm2. However, the weld depth can be reduced or increased as needed. For example, the 30% mentioned above are divided into 15% on each of the side surfaces of the sheet metal lamellas. Taking account of a minimum bending radius specified by the manufacturer of the metal sheets, the metal sheets can be bent cold.

By using a CNC control, the invention is suitable for producing in large quantities, wherein due to the low energy input, the production costs can be reduced considerably.

The high welding speed (20 m/min) allows a production speed in intervals of a few minutes because a plurality of lamellas can be welded at the same time.

BRIEF DESCRIPTION OF THE DRAWINGS

The invention is explained in more detail below by means of exemplary embodiments which are illustrated in the drawing. In the figures:

FIG. 1 shows a perspective exploded view of a fork arm according to the invention and the individual parts thereof, FIG. 2 shows a perspective partial view from below of gradually shortened lamellas, FIG. 3 shows an enlarged side view of the region of the fork bend, FIG. 4 shows a side view of a completely assembled fork arm, FIG. 5 shows the fork arm of FIG. 4 in a perspective view from below and from the front, FIG. 6 shows another illustration of the fork arm according to FIG. 4, FIG. 7 shows a detail of FIG. 6 of straightened sheet metal lamellas of the fork arm, FIG. 8 shows a cross-section according to the section A-A of FIG. 10 with the individual sheet metal lamellas, FIG. 9 shows an enlarged detail of FIG. 8, FIG. 10 shows another illustration of the fork arm according to FIG. 4, FIG. 11 shows the enlarged region of the fork bend of the fork arm of FIG. 10.

DETAILED DESCRIPTION OF THE PREFERRED EMBODIMENTS

Figure 12:
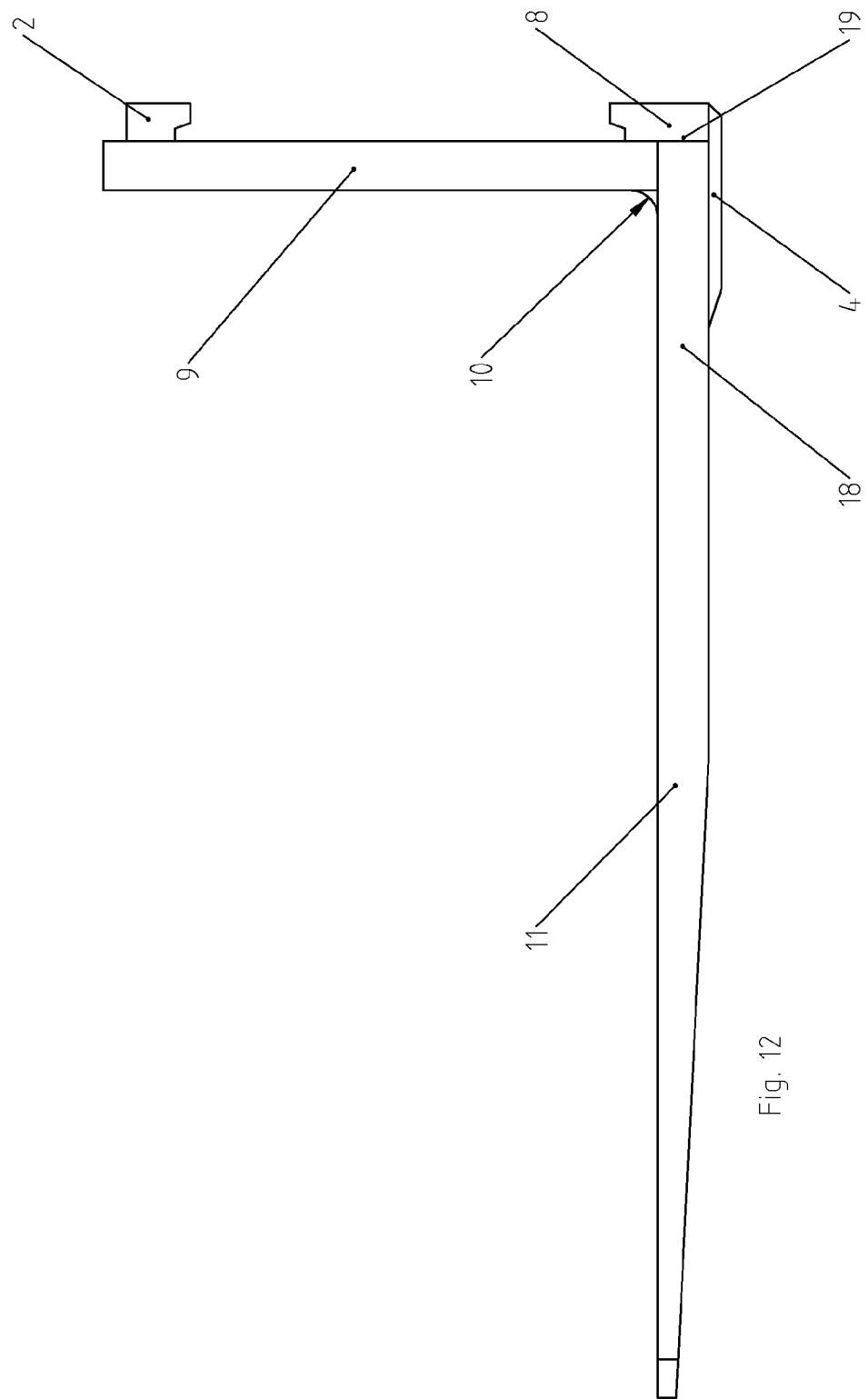
FIG. 12 shows a further embodiment if a fork arm produced according to the invention in a schematic side view.

FIG. 1 shows the perspective exploded view of a first embodiment of a fork arm 18 in steel lamella construction, wherein each individual lamella 1, for example made of Docol 1500 M (with a tensile strength of 1500 N/mm2), is used with a sheet thickness (for example 2 mm) that allows cold bending without any problems. The fork blade 5 of the fork arm 18, which fork blade is substantially horizontal in the position of use, transitions via a fork bent 19 into a vertical fork back 20. As yet to be explained below, the individual lamellas 1 are welded together at the edge by electron beam welding, wherein the weld penetrates with a depth of at least 3 mm between adjoining surfaces of the parts.

Since the strength of the welds is very high, a weld depth of 30% of the fork arm width is sufficient for producing a high-strength fork arm. However, the weld depth can be reduced or increased as needed, wherein welding through the entire width of the fork arm is also possible.

The mentioned 30% are divided into 15% on each of the side surfaces of the sheet metal lamellas. In the case of the metal sheets that are used and mentioned as an example, the minimum bending radius r specified by the sheet metal manufacturer is 14 mm.

FIG. 1 further shows an upper connection element 2 that is welded in a planarly contacting manner to the lamella packet by means of electron beam welding and/or laser beam welding methods. A lower connection element 3 is adapted to the outer radius of the fork bend packet and, if necessary, is also welded thereon in a planarly contacting manner by means of the mentioned welding methods. A wear plate 4 made of, for example, HARDOX 500 is also welded thereon in a planarly contacting manner by means of the mentioned welding method. The connection elements can be made from the steel grade S235JR, for example.

Advantageously, the individual sheet metal lamellas are increasingly shortened towards the bottom. In FIG. 2, the lower surfaces 6 of the shortened lamellas are shown, wherein this shortening from top to bottom has the effect that the fork arm tapers towards the front. Such a tapered fork arm shape is desired in most cases because it facilitates engaging underneath a load. Outer cover lamellas 1 can also be made of another metal, e.g., a non-ferrous metal and can also be welded together with the other ones.

FIG. 3 shows that the inner radius r of the fork bend is smaller than the outer radius, which outer radius is not illustrated here. Furthermore, the fork bend diagonal d1 is almost double as thick as the fork arm thickness d. All components to be welded are coherently placed on top of one another so that during welding no additional weld material has to be introduced. Dimensioning that corresponds approximately to the described dimensioning has a particularly advantageous effect on the strength in the region of the fork bend.

FIG. 4 shows the individual components in the assembled state of the fork arm 18 from the side, and FIG. 5 shows the finished fork arm 18 in perspective view from the front, from below and from the left side.

FIG. 6 too shows the finished fork arm 18 with the connection elements 2, 3 welded thereto, and the wear plate 4. It is to be noted here that the lower connection element 3 can also be integrally formed with the wear plate 4, thereby enclosing the fork bend 19 from the outside.

FIG. 7 shows the straightened sheet metal lamellas in an enlarged illustration of FIG. 6. Said straightening can be carried out, for example, by machining.

From the cross-section of the fork arm blade according to FIG. 8 and from the enlarged illustration of FIG. 9 of a detail of FIG. 8 it is apparent that the welding of the individual sheet metal lamellas is carried out starting from the edge. It is in particular shown how narrow the weld 7 is, for example, only ca. 0.5 mm, and how deep the electron beam welding process penetrates, namely ca. 15 mm in this exemplary embodiment. According to the invention, the weld depth has to be at least 3 mm on both sides, but can also be considerably deeper and can also extend over the entire sheet metal width.

FIG. 10 shows again a finished fork arm 18, wherein the enlarged detail illustrated in FIG. 11 shows that the wear plate 4 and the lower connection element 3 are also welded in planarly contacting manner.

The described embodiment also has the advantage that due to the lamella construction, the fork arm cannot break abruptly, because due to the interrupted cross-section, a potential crack cannot propagate through the entire cross-sectional area.

FIG. 12 shows a variant of the fork arm in a further embodiment of the invention in a schematic side view, wherein a heat-treatable steel with a profiled shape is used. The individual components, namely a fork back 9, a fork blade 11, an upper connection element 2, a lower connection element 8, a wear plate 4 and a fillet piece 10 are also welded together here by electron beam welding and/or laser welding, wherein the weld penetrates with a depth of at least 3 mm between adjoining surfaces of the parts. Here too, the fork bend is designated by 19.

Figure 13:
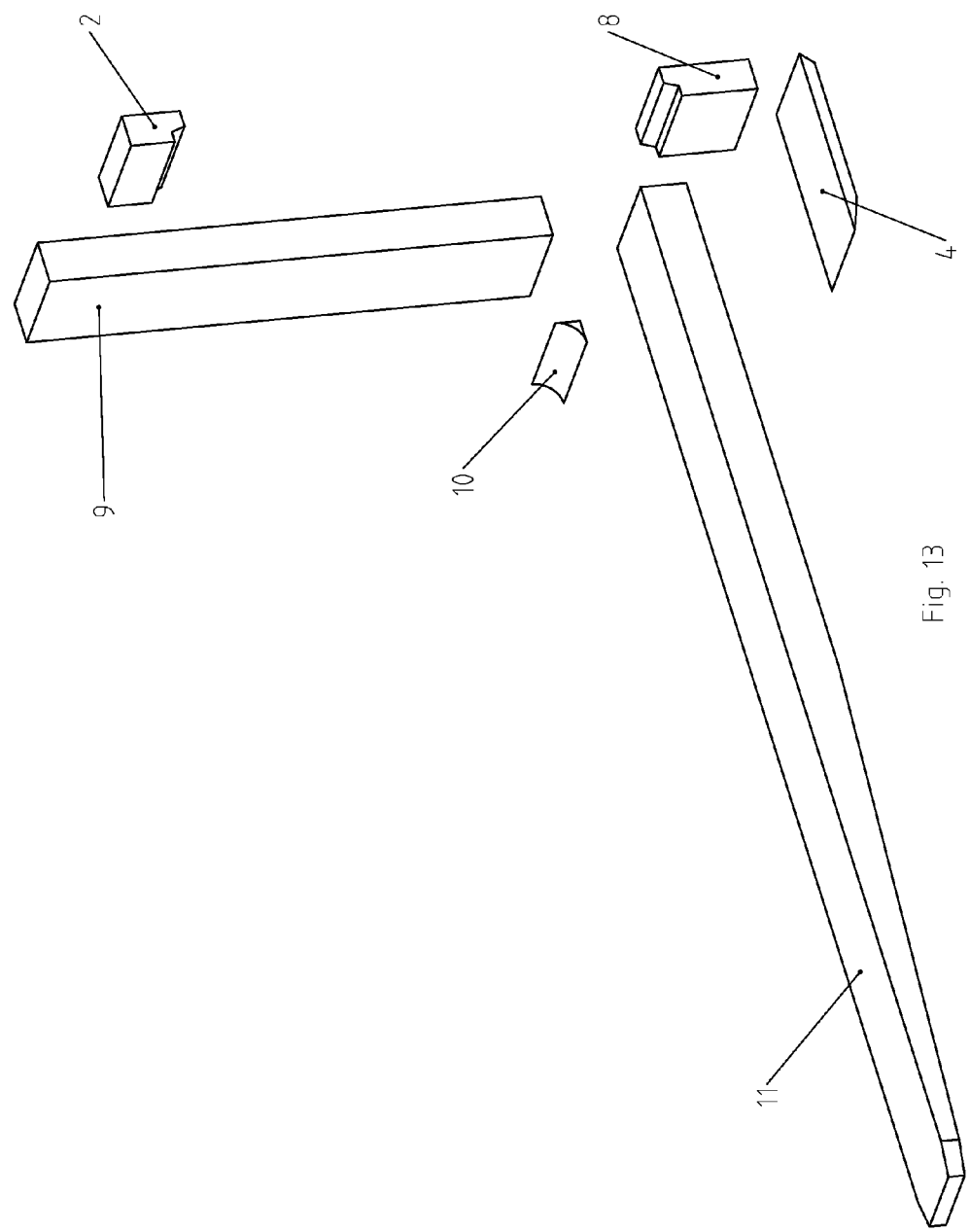
FIG. 13 shows an exploded view of the individual parts of the fork arm of FIG. 12.

FIG. 13 shows the exploded view of the mentioned individual parts of the fork arm from FIG. 12 prior to welding.

Only by using the electron beam welding method or laser welding method, there is the possibility that, due to the low energy input, the micro structures of the already hardened and tempered heat-treatable steel (e.g., 36 NiCrMo16 material no. 1.6773 with a tensile strength of 1050 N/mm2) can be largely maintained. Annealing and subsequent bending and forging is not required here for the construction of the individual parts shown. Also, stress relief annealing can be eliminated due to the minimal heat input. The assembled combination of the components as shown in FIG. 12 corresponds optimally to the static requirements. The entire welding process takes less than 10 second per fork arm.

Figure 14:
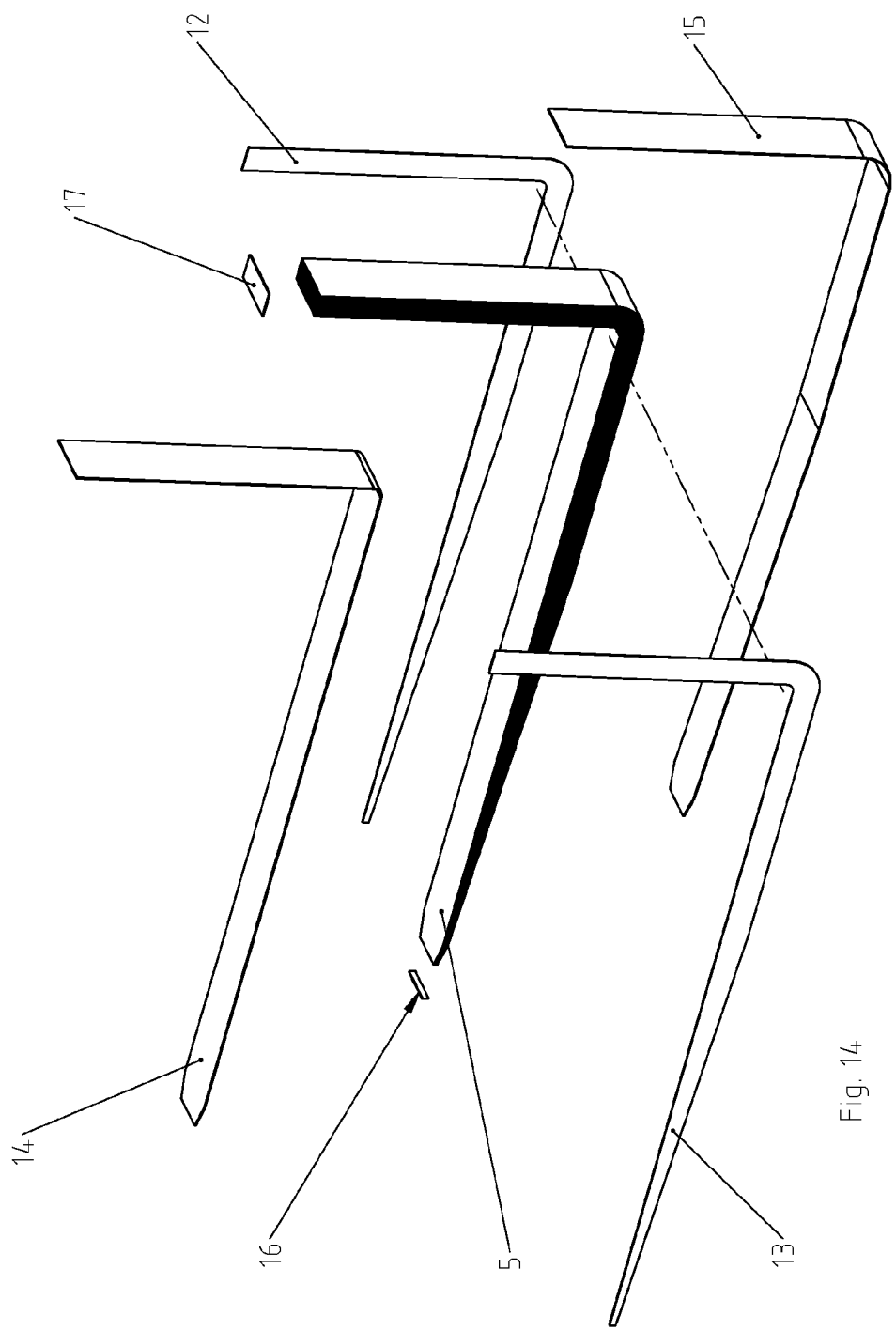
FIG. 14 shows a further exploded view of a fork arm covered with sheet metal elements.
Figure 15:
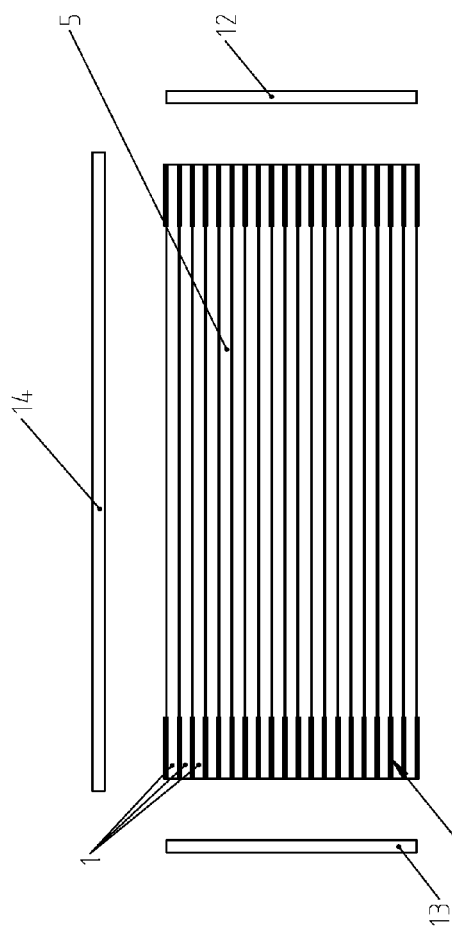
FIG. 15 shows a cross-section through the core of the fork arm of FIG. 14 and the cover elements.
Figure 16:
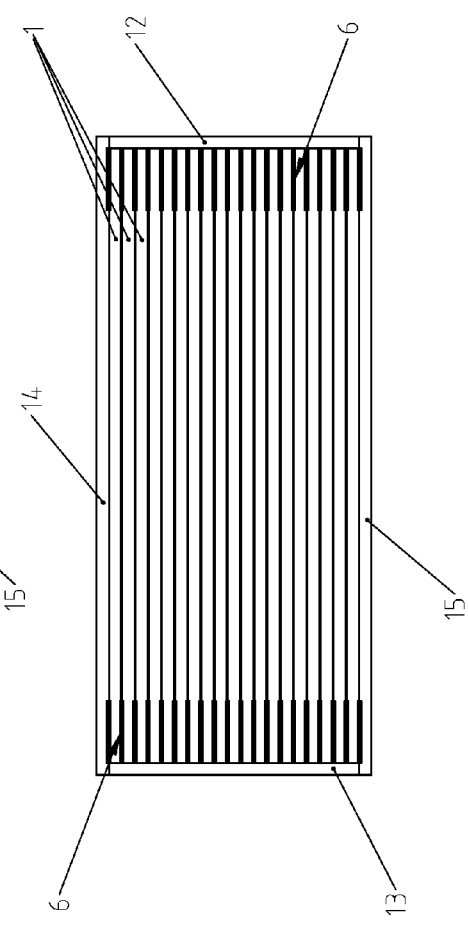
FIG. 16 shows in a view as in FIG. 15 the welded finished state.

FIG. 14 shows the exploded view of a further embodiment of a fork arm 18 in which a one-piece base body 18', which has been fabricated beforehand, e.g., according to FIG. 1, is covered with cover lamellas 12, 13, 14, 15, 16, 17 which are made from non-ferrous metal or stainless steel, and, according to the invention, are welded together with the base body 18' from steel by using the electron beam welding and/or laser beam welding method. FIG. 15 shows in cross-section the base body 18' and the cover elements 12 to 17 in a still unassembled state, and FIG. 16 shows in cross-section the base body 18' and the cover elements 12 to 17 from stainless steel and non-ferrous metal, respectively, in the assembled state obtained by using the electron beam welding and/or laser welding methods. The use of cover lamellas made from certain other metals is considered for the use of the fork arm 18 in environments with specific requirements such as, e.g., the food industry. In the food sector it is often required to use stainless high-grade steel for the fork arm. By welding stainless steel cover lamellas together with the normal sheet metal lamellas, there is the possibility of significant cost savings.

It is also to be mentioned, for example, that in the case of explosion-proof fork arms (prevention of spark formation), it is possible to weld, e.g., bronze, or in general a non-ferrous metal, together with steel.

The invention claimed is:

1. A fork arm for load-carrying devices, comprising:
   a fork blade comprising a longitudinally horizontally extending portion;
   a fork bend comprising a front surface, a rear surface, an upper surface, and a lower surface;
   a fork back comprising a longitudinal vertically extending portion;
   the longitudinally horizontally extending portion of the fork blade having an upper surface, a lower surface, first and second sides, and a distal end opposing the fork bend, said fork blade comprising a plurality of lamellas arranged to form a stack of lamellas, the stack of lamellas comprising at least a top lamella and a bottom lamella, wherein each lamella of the plurality of lamellas includes a first side, a second side, an upper planar surface, a lower planer surface, and a length corresponding with the longitudinally horizontally extending portion of the fork blade measured from the fork bend to the distal end of the fork blade, wherein the length of each individual lamella decreases from said top lamella to said bottom lamella; the stack of lamellas comprising at least a first lamella and a second lamella, the second lamella being located adjacent to the first lamella in the stack of lamellas, wherein the first lamella is connected to the second lamella by a weld that penetrates the upper planar surface of the first lamella and the lower planar surface of the second lamella to depths of at least 15 mm, the weld having been formed by electron beam welding;
   the longitudinally vertically extending portion of the fork back further comprising an inner surface, an outer surface, and a distal end opposing the fork bend, the fork arm further comprising
   an upper connection element affixed to the distal end of the fork back for attaching the fork arm to a conveying device,
   a lower connection element affixed to the rear surface of the fork bend for attaching the fork arm to the conveying device, and
   a wear plate affixed to the lower surface of the fork bend.

2. The fork arm according to claim 1, the stack of lamellas comprising at least one cover lamella constructed of non-ferrous metal that is welded together with an adjacent lamella of the stack of lamellas that is constructed of steel.

3. The fork arm according to claim 1, wherein the plurality of lamellas are constructed of stainless steel, non-ferrous metal or a combination thereof.

4. The fork arm according to claim 1, wherein the upper and lower connection elements are welded to the fork back in a planarly contacting manner, wherein the lower connection element is formed integrally with the wear plate, thereby enclosing the fork bend from the outside.

5. The fork arm according to claim 1, the fork blade comprising a fork arm thickness that is measured orthogonally between the upper surface and the lower surface thereof, the front surface of the fork bend comprising a curved portion having a centerpoint, the wear plate and the lower connection element being located adjacent to each other and collectively covering the lower and rear surfaces of the fork bend, the wear plate and the lower connection element meeting at a connection point that is located furthest away from the centerpoint, the fork bend having a fork bend diagonal thickness measured between the centerpoint and the connection point, wherein the fork bend diagonal thickness is almost twice that of the fork arm thickness.

* * * * *